(12) United States Patent
Koebel et al.

(10) Patent No.: US 9,286,806 B2
(45) Date of Patent: Mar. 15, 2016

(54) METHOD AND DEVICE FOR REVISING A LOW-ALTITUDE FLIGHT PHASE OF A FLIGHT PATH OF AN AIRCRAFT

(71) Applicant: Airbus Operations SAS, Toulouse (FR)

(72) Inventors: Thomas Koebel, Toulouse (FR); Nicolas Albert, La Salvetat Saint Gilles (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 14/510,268

(22) Filed: Oct. 9, 2014

(65) Prior Publication Data

US 2015/0112583 A1    Apr. 23, 2015

(30) Foreign Application Priority Data

Oct. 17, 2013   (FR) ...................... 13 60111

(51) Int. Cl.
| | |
|---|---|
| G01C 21/00 | (2006.01) |
| G08G 5/00 | (2006.01) |
| B64D 45/00 | (2006.01) |
| G05D 1/10 | (2006.01) |

(52) U.S. Cl.
CPC .............. G08G 5/0039 (2013.01); B64D 45/00 (2013.01); G01C 21/00 (2013.01); G05D 1/101 (2013.01)

(58) Field of Classification Search
CPC ...... B64D 45/00; G01C 21/00; G08G 5/0039; G05D 1/101
USPC ........................................................ 701/400
See application file for complete search history.

(56) References Cited

U.S. PATENT DOCUMENTS

| | | | |
|---|---|---|---|
| 5,340,061 A | 8/1994 | Vaquier et al. | |
| 6,449,556 B1 * | 9/2002 | Pauly | G01C 23/00 701/120 |
| 6,507,782 B1 * | 1/2003 | Rumbo | G05D 1/0202 244/182 |
| 8,565,938 B2 * | 10/2013 | Coulmeau | G01C 21/20 701/120 |
| 2005/0261808 A1 | 11/2005 | Artini et al. | |
| 2005/0273249 A1 * | 12/2005 | Artini | G05D 1/0646 701/120 |
| 2010/0324812 A1 * | 12/2010 | Sacle | G01C 21/00 701/467 |
| 2015/0192926 A1 * | 7/2015 | Kozlow | G05D 1/0202 701/3 |
| 2015/0192927 A1 * | 7/2015 | Kozlow | G05D 1/0646 701/5 |
| 2015/0204675 A1 * | 7/2015 | Albert | G01C 21/20 701/400 |
| 2015/0254989 A1 * | 9/2015 | Kozlow | G08G 5/0039 701/466 |

OTHER PUBLICATIONS

FR Search Report Jul. 25, 2014.

* cited by examiner

*Primary Examiner* — Calvin Cheung
*Assistant Examiner* — Paula L Schneider
(74) *Attorney, Agent, or Firm* — Lerner, David, Littenberg, Krumholz & Mentlik, LLP

(57) ABSTRACT

A device for revising a low-altitude flight phase of a flight path of an aircraft includes an input unit configured to allow an operator to input parameters to define an intermediate flight section (Si) which has to be inserted into a low-altitude flight phase, and a processing unit configured to calculate a profile relating to the intermediate flight section (Si) using input parameters, and to automatically insert this profile into the flight phase between a first upstream part (P1) and a second downstream part (P2) so as to establish a revised flight phase (PR).

9 Claims, 1 Drawing Sheet

METHOD AND DEVICE FOR REVISING A LOW-ALTITUDE FLIGHT PHASE OF A FLIGHT PATH OF AN AIRCRAFT

FIELD OF THE INVENTION

The present invention relates to a method and a device for revising a low-altitude flight phase of a flight path of an aircraft, in particular of a military transport aeroplane.

Within the context of the present invention, "low-altitude flight phase", referred to as an LLF (low level flight) phase, means at least one part of a flight path that allows an aircraft to fly at low altitude, in particular in order to follow the terrain over which it is flying as closely as possible, in particular to avoid being detected, while eliminating any risk of collision with part of said terrain. Such an LLF phase is generally located at a predetermined terrain height, for example at 500 feet (approximately 150 meters).

BACKGROUND OF THE INVENTION

A low-altitude flight function, referred to as an LLF function, of the managed type (that is to say, certain data of which are used, such as the path to be followed, are defined by automatic systems and in particular by a flight management system (FMS)) is also known. This function, which is on board an aircraft, allows the crew to fly the aircraft under automatic guidance control at a low level of as little as 500 feet above the ground in instrument flight conditions. The automated flight device guides the aircraft along a three-dimensional path established by the flight management system (FMS), taking into account the lateral flight plan, the terrain over which said aircraft is flying, performance of the aircraft and parameters input into the FMS system by the crew.

An LLF phase (or LLF operation) corresponds to a continuous portion of the flight plan along which the crew would like to fly according to an LLF function. In order to produce an LLF phase, the pilot therefore has to input a plurality of parameters that are specified below, referred to as phase parameters.

The pilot also has the option of defining successive sections within the LLF phase using parameters that are also specified below, referred to as section parameters. Once the set of parameters is set and the structure of the LLF sections is defined, the FMS system can calculate the three-dimensional path that the aircraft will follow.

Once the LLF phase has been defined by the crew and established by the FMS system, the pilots have the option of applying the following modifications to the path, before or during the flight:

- a lateral modification to the path (by requiring the aircraft to fly directly towards a waypoint by inserting a new waypoint or deleting a waypoint);
- a modification to the parameters set during the process of defining the LLF phase (with the exception of certain phase parameters when the corresponding phase is followed).

However, the LLF function does not allow the crew to separate an existing LLF phase into two in order to obtain two separate phases while maintaining their structure, in particular for inserting an intermediate section between these two parts.

The above-mentioned modifications allow an LLF phase to be shortened by selecting a new phase entry or exit waypoint. However, the second part of the LLF path is then lost, as well as its structure. In order to retrieve this second part, it is necessary to integrally reconstruct a new LLF phase by re-inserting the same parameters after the intermediate section.

BRIEF SUMMARY OF THE INVENTION

An aspect of the present invention relates to overcoming this disadvantage. It relates to a method for revising a low-altitude flight phase of a flight path of an aircraft allowing an intermediate section to be inserted, said low-altitude flight phase comprising at least one flight section, said low-altitude flight phase being defined from first parameters comprising phase parameters (including the name and altitude of an entry waypoint and the name and altitude of an exit waypoint) and section parameters.

According to an aspect of the invention, said method comprises:

a) inputting second parameters to define an intermediate flight section, said intermediate flight section having to be inserted into said flight phase, said second parameters comprising the name and the altitude of an upstream waypoint, the name and the altitude of a downstream waypoint, an altitude and a speed;

b) distributing said first and second parameters so as to allocate them to a first upstream part of the flight phase, to a second downstream part of the flight phase and to the intermediate flight section, such that:

said first parameters, except for the name and the altitude of an exit waypoint, which parameters are substituted with the name and altitude of said upstream waypoint as input in step a), are allocated to said first upstream part;

said first parameters, except for the name and the altitude of an entry waypoint, which parameters are substituted with the name and altitude of said downstream waypoint as input in step a), are allocated to said second downstream part; and the altitude and the speed as input in step a) are allocated to said intermediate flight section;

c) calculating a profile relating to said intermediate flight section using said input altitude and speed and automatically inserting this profile into the flight phase between said first upstream part and said second downstream part so as to establish a revised flight phase comprising, successively in the direction of flight of the aircraft, said first upstream part, said intermediate section and said second downstream part; and d) transmitting said revised flight phase to a user device.

Thus, owing to an aspect of the invention, it is possible to insert an intermediate section into an LLF phase (low-altitude flight phase) in order to obtain a revised flight phase comprising, successively in the direction of flight of the aircraft, said first upstream part, said intermediate section and said second downstream part, which have a common point each time, so as to obtain a continuous revised flight phase having two upstream and downstream parts which maintain their original structure.

The profile relating to the intermediate flight section is a speed and altitude profile defining the speed and altitude to be followed along the intermediate section.

Furthermore, "structure" means the division into sections and "original structure" means the structure before a revision.

In a first aspect, step a) comprises:

accessing a page dedicated to revising a low-altitude flight phase, displayed on a display screen, said dedicated page requiring said second parameters to be input; and inputting, by means of input elements, said second parameters comprising the exit waypoint of the first upstream part and the entry waypoint of the second downstream part as upstream and downstream waypoints respectively.

Furthermore, in a second aspect, step a) comprises:

accessing a page displayed on a display screen intended for managing a flight plan of the aircraft, said page comprising a part requiring said second parameters to be input; and inputting, by means of input elements, said second parameters allowing the intermediate section to be defined and comprising the start and end waypoints of the intermediate section as upstream and downstream waypoints respectively.

Advantageously, said method comprises an additional step after step d), said additional step consisting in modifying at least one of the first parameters relating to the revised flight phase and in adapting the revised flight phase to the first parameter thus modified.

The present invention also relates to a device for revising a low-altitude flight phase of a flight path of an aircraft.

According to an embodiment of the invention, said revision device comprises:

an input unit configured to allow an operator to input second parameters to define an intermediate flight section which has to be inserted into said flight phase, said second parameters comprising the name and the altitude of an upstream waypoint, the name and the altitude of a downstream waypoint, an altitude and a speed;

a processing unit configured to distribute said first and second parameters so as to allocate them to a first upstream part of the flight phase, to a second downstream part of the flight phase and to the intermediate flight section, such that:

said first parameters, except for the name and the altitude of an exit waypoint, which parameters are substituted with the name and altitude of said upstream waypoint as input, are allocated to said first upstream part;

said first parameters, except for the name and the altitude of an entry waypoint, which parameters are substituted with the name and altitude of said downstream waypoint as input, are allocated to said second downstream part; and the input altitude and speed are allocated to said intermediate flight section, said processing unit also being configured to calculate a profile relating to said intermediate flight section using said input altitude and speed and to automatically insert this profile into the flight phase between said first upstream part and said second downstream part so as to establish a revised flight phase comprising, successively in the direction of flight of the aircraft, said first upstream part, said intermediate section and said second downstream part; and a data transmission unit configured to transmit the revised flight phase to a user device.

In a first embodiment, the input unit comprises a display screen that displays a page dedicated to revising a low-altitude flight phase, and input elements configured to allow data to be input into said dedicated page.

Furthermore, in a second embodiment, the input unit comprises a display screen that displays an input window on a page intended for managing a flight plan, and input elements configured to allow data to be input into said input window.

Advantageously, said revision device further comprises a modification unit allowing an adaptation to be carried out following a modification to at least one of the first parameters.

The present invention also relates to a flight management system which comprises such a revision device.

The present invention also relates to an aircraft, in particular a transport aeroplane, which is provided with a revision device as set out above and/or with a flight management system comprising such a revision device.

BRIEF DESCRIPTION OF THE DRAWINGS

The figures of the accompanying drawings will give a better understanding of how the invention can be carried out. In these figures, identical references numerals designate similar elements.

DETAILED DESCRIPTION

Figure 1:
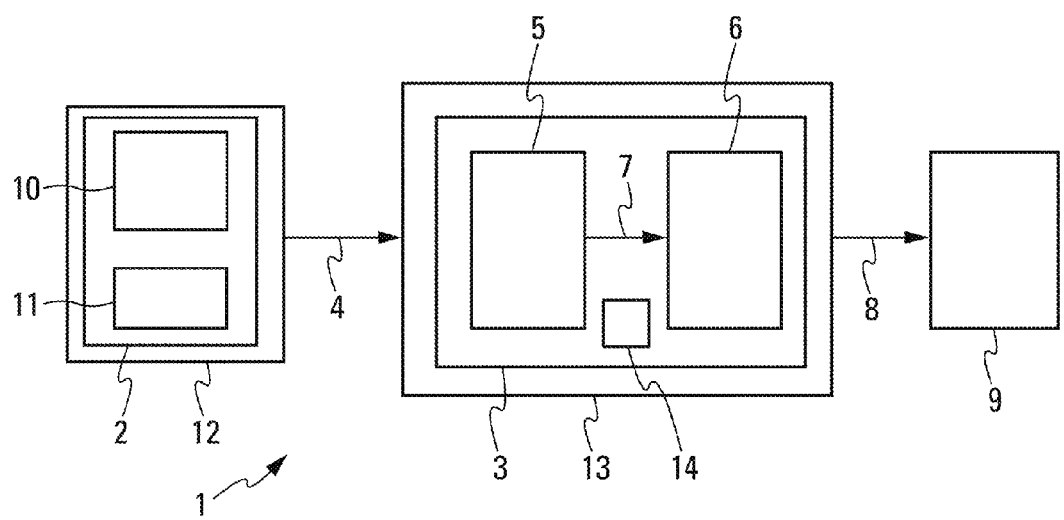
FIG. 1 is a block diagram of a revision device which shows an embodiment of the invention.

The device 1 shown schematically in FIG. 1 and illustrating an embodiment of the invention is intended to carry out a revision to a low-altitude flight phase P0 of a flight path TV of an aircraft (not shown), in particular of a military transport aeroplane.

Figure 2A:
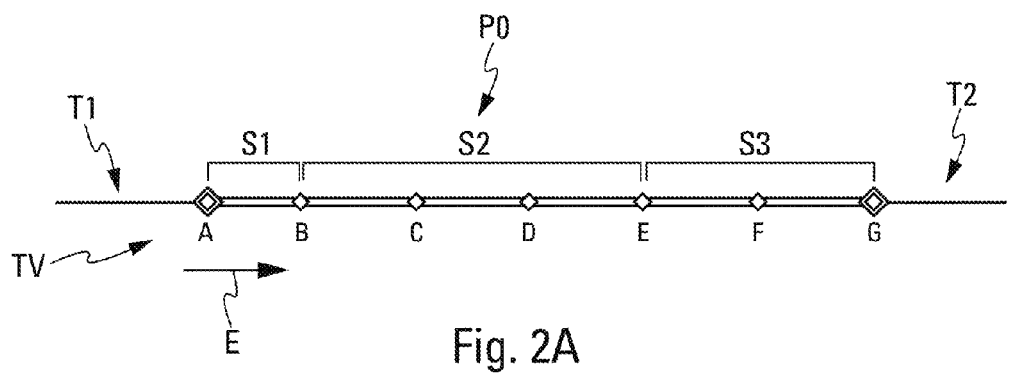
FIGS. 2A and 2B respectively schematically show an initial low-altitude flight phase and a revised low-altitude flight phase resulting from a revision of the initial low-altitude flight phase.

FIG. 2A shows a flight path TV comprising an upstream path part T1 and a downstream path part T2, in the direction E of flight of the aeroplane, and, between these two parts T1 and T2, a low-altitude flight phase P0 as considered in the present invention.

Said low-altitude flight phase P0 comprises a plurality of successive sections S1, S2 and S3. Within the context of the present invention, "successive sections" means two sections which directly follow each other and which have a common point, so as to form a link.

More particularly, in the example in FIG. 2A:

the section S1 has an entry waypoint A and an exit waypoint B;

the section S2 has the point B as an entry waypoint, and an exit waypoint E, and it passes through waypoints C and D; and the section S3 has the point E as an entry waypoint, and an exit waypoint G, and it passes through a waypoint F.

The LLF phase P0 corresponds to a continuous portion of the flight plan along which the crew would like to fly according to an LLF function. The following parameters have to be set in the usual manner by the pilot using a conventional input system 12 (connected to a flight management system (FMS) such as the system 13 from FIG. 1) in order to produce an LLF phase:

the name of the entry waypoint A (pre-existing in the flight plan);

an entry altitude;

the name of the exit waypoint G (pre-existing in the flight plan);

an exit altitude;

a temperature difference DISA relative to the standard temperature;

an SCH (set clearance height) value which contributes to defining the minimum flying height;

an LNC (low noise cruise) status which defines whether or not the aircraft will fly through the LLF phase with its engines in an LNC mode (with an impact on the fuel consumption predictions);

an average altitude of the profile (used by the FMS system (system 13 in FIG. 1) for time and fuel predictions);

a speed;

a safety altitude, which is used to define a safe altitude above the LLF phase, which is joined in the event of a malfunction; and a half-corridor of the safety altitude.

Of the above-mentioned parameters, the first seven parameters are referred to as phase parameters, since they are common to the entire LLF phase P0.

The last four parameters may vary throughout the LLF phase P0. These last four parameters are referred to as section parameters. Indeed, the pilot has the option of defining LLF sections (S1, S2 and S3) by accessing a dedicated page, each section S1 to S3 being defined according to the particular section parameters. In order to do this, the pilot is requested to set the following parameters (using the input unit 12) for each section S1 to S3:

the name of the start waypoint of the section, for example the point B for the section S2 in FIG. 2A;

the name of the end waypoint of the section, for example the point E for the section S2;

the average altitude of the section;

the speed;

the safety altitude; and the half-corridor of the safety altitude.

The low-altitude flight phase P0 is therefore defined from first parameters comprising phase parameters and section parameters. The definition of sections S1 to S3 within the LLF phase P0 allows the pilot to refine the definition of the LLF operations according to the four section parameters.

Once the set of parameters is set and the structure of the LLF sections is defined, the FMS system 13 can calculate, in a conventional manner, the three-dimensional path TV that the aeroplane will follow.

It may be useful to revise such an LLF phase by inserting an intermediate section Si. By way of illustration, during a low-altitude flight of a military transport aeroplane along an LLF phase, it may be desired to insert an intermediate section Si intended for a drop, for example for dropping troops or goods, in a localised region of the LLF phase, the speed and altitude remaining constant within this intermediate section Si. More generally, the invention is applicable to any tactical operation to be carried out between two LLF operations.

In order to do this, according to an embodiment of the invention, said revision device 1 intended to revise an LLF phase P0 as set out above comprises, as shown in FIG. 1:

an input unit 2 configured to allow an operator to input second parameters to define an intermediate flight section Si that has to be inserted into said flight phase P0. These second parameters comprise the name and the altitude of a waypoint referred to as upstream waypoint C, the name and the altitude of a waypoint referred to as downstream waypoint D, an altitude and a speed;

a processing unit 3 which is connected by means of a link 4 to the input unit 2 and which comprises a processing module 5 and a calculation module 6 interconnected by means of a link 7; and a data transmission unit 8 which is configured to transmit a revised flight phase PR (FIG. 3) received from the processing unit 3 to a user device 9, in particular to an automated flight device which automatically controls the aeroplane along this revised flight phase PR, or to a flight director which displays piloting instructions allowing the revised flight phase PR to be followed.

In addition, according to an embodiment of the invention, the processing module 5 is configured to distribute said first and second parameters so as to allocate them to a first upstream part P1 of the flight phase (FIG. 2B), to a second downstream part P2 of the flight phase and to the intermediate flight section Si, such that:

said first parameters, except for the name and the altitude of an exit waypoint, which parameters are substituted with the name and altitude of said upstream waypoint C, are allocated to said upstream part P1;

said first parameters, except for the name and the altitude of an entry waypoint, which parameters are substituted with the name and altitude of said downstream waypoint D, are allocated to said downstream part P2; and the input altitude and speed are allocated to said intermediate flight section Si.

Figure 2B:
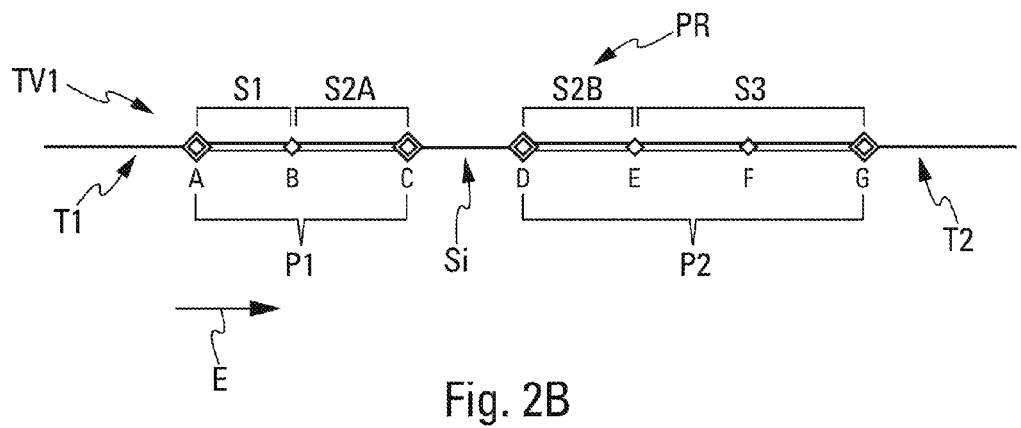

Furthermore, according to an embodiment of the invention, the calculation module 6 is configured to calculate, in a conventional manner, the profile relating to said intermediate flight section Si using said input altitude and speed and to automatically insert this profile into the flight phase between said upstream part P1 and said downstream part P2 so as to establish a revised flight phase PR comprising, successively in the direction E of flight of the aircraft, said upstream part P1, said intermediate section Si and said downstream part P2, as shown in FIG. 2B.

The revision device 1 can thus insert an intermediate section Si into an LLF phase (low-altitude flight phase P0) so as to obtain a revised flight phase PR comprising, successively in the direction E of flight of the aircraft, said upstream part P1, said intermediate section Si and said downstream part P2, which have a common point (C for P1 and Si, and D for Si and P2) each time, so as to obtain a continuous revised flight phase PR having two upstream and downstream parts P1 and P2 which maintain their original structure. Together with the (unchanged) upstream and downstream parts T1 and T2 of the path, the revised flight phase PR forms a path TV1, as shown in FIG. 2B.

The crew thus has a revision device 1 allowing the LLF phase P0 to be split while maintaining the structure in sections of the two parts P1 and P2 obtained and while inserting an intermediate section Si therebetween. Using the revision device 1 saves the crew a considerable amount of time.

The six parameters required for carrying out the revision are as follows:

the exit waypoint C of the upstream part P1 of the flight phase;

the exit altitude of this upstream part P1;

the entry waypoint D of the downstream part P2 of the flight phase;

the entry altitude of this downstream part P2;

the altitude of the intermediate section Si; and the speed imposed on the intermediate section Si.

The other parameters required for defining the phases P1 and P2 come from the initial LLF phase P0, and the structure in sections S1, S2A, S2B, S3 is maintained on the corresponding path portions.

When splitting an LLF phase, two constraints have to be respected:

the two resulting LLF phases P1 and P2 have to be assigned all of the parameters necessary for generating an LLF phase; and two LLF phases cannot be adjacent: an intermediate section Si has to be present between the two resulting LLF phases P1 and P2, with defined parameters.

The input unit 2 comprises a display screen 10 that displays a page explained below, and input elements 11 configured to allow data to be input into said page. The input elements 11 may be any conventional means allowing data to be input, such as a trackball, a touch pad or a voice recognition unit.

In a preferred embodiment, the input unit 2 is part of the conventional input system 12 connected to the FMS system 13, and the processing unit 3 (which carries out the processing relating to the revision) is part of the FMS system 13, as shown in FIG. 1.

Moreover, in a first embodiment, the display screen 10 of the input unit 2 may display a page dedicated to revising a low-altitude flight phase, and the input elements are configured to allow data to be input into this dedicated page.

In this first embodiment, the revision can be accessed via conventional sub-menus on a display of a flight plan page of the FMS system providing a textual representation of the flight plan, or on a navigation and tactical display providing a graphical representation of the flight plan. A page (or a specific window) is thus opened, inviting the pilot to fill in the necessary parameters.

In this first embodiment, the pilot designates the waypoint at which he wants to split the initial LLF phase P0, and the processing unit 3 establishes the intermediate section Si.

In this first embodiment, the input therefore consists in the pilot:
 accessing the page dedicated to revising a low-altitude flight phase, displayed on the display screen 10, said dedicated page requiring said second parameters to be input; and
 inputting, by means of input elements 11, said second parameters comprising the exit waypoint C of the first upstream part P1 and the entry waypoint D of the second downstream part P2 as upstream and downstream waypoints respectively.

The six necessary parameters mentioned above are entered by the pilot via dedicated fields, comprising default values. The pilot inputs, as second parameters:
 the name and the altitude of the exit waypoint C of the part P1;
 the name and the altitude of the entry waypoint D of the part P2; and
 the altitude and the speed of the intermediate section Si.

The processing module 5 therefore distributes the second parameters thus input, as well as the first parameters which were previously input to define the LLF phase P0, so as to allocate:
 to the upstream part P1:
 the SCH and DISA values, and the LNC status;
 the name and the altitude of the entry waypoint A of the part P1;
 the section parameters (speed, average altitude, etc.) for S1 and S2A; and
 the name and the altitude of the exit waypoint C of the part P1, input by the pilot for the purposes of revision;
 to the downstream part P2:
 the SCH and DISA values, and the LNC status;
 the name and the altitude of the entry waypoint D of the part P2, input by the pilot for the purposes of revision;
 the section parameters (speed, average altitude, etc.) for S2B and S3; and
 the name and the altitude of the exit waypoint G of the part P2; and
 to the intermediate section $S_i$, the altitude and the speed of this intermediate section $S_i$, input by the pilot for the purposes of revision.

Furthermore, in a second embodiment, the display screen 10 of the input unit 2 is capable of displaying an input window on a page intended for managing a flight plan, and the input elements 11 are configured to allow data to be input into this input window.

In this second embodiment, the pilot defines the intermediate section Si, and the processing unit 3 splits the LLF phase.

In this second embodiment, the input therefore consists in the pilot:
 accessing the page displayed on the display screen 10 intended for managing a flight plan of the aircraft, said page comprising a part requiring said second parameters to be input for the purposes of revision; and
 inputting, by means of input elements 11, said second parameters allowing the intermediate section Si to be defined and comprising the start (or entry) waypoint C and the end (or exit) waypoint D of the intermediate section Si as upstream and downstream waypoints respectively.

The six required parameters mentioned above are determined by the characteristics of the inserted intermediate section Si. In particular, the start and end waypoints of the intermediate section Si determine the exit and entry point of the resulting LLF phases, and the entry and exit altitudes are selected by default to be equal to the altitude of the intermediate section Si. The pilot thus inputs, as second parameters:
 the name of the start waypoint C of the intermediate section Si;
 the name of the end waypoint D of the intermediate section Si; and
 the altitude and the speed of the intermediate section Si.

The altitudes of the waypoints C and D are selected to be equal to the altitude of the intermediate section Si (input by the pilot).

The processing module 5 therefore distributes the second parameters thus input, as well as the first parameters which were previously input to define the LLF phase P0, so as to allocate:
 to the upstream part P1:
 the SCH and DISA values, and the LNC status;
 the name and the altitude of the entry waypoint A of the part P1;
 the section parameters (speed, average altitude, etc.) for S1 and S2A; and
 the name and the altitude of the exit waypoint C of the part P1, which corresponds to the start of the intermediate section Si, as input by the pilot for the purposes of revision;
 to the downstream part P2:
 the SCH and DISA values, and the LNC status;
 the name and the altitude of the entry waypoint D of the part P2, which corresponds to the end of the intermediate section Si, as input by the pilot for the purposes of revision;
 the section parameters (speed, average altitude, etc.) for S2B and S3; and
 the name and the altitude of the exit waypoint G of the part P2; and
 to the intermediate section Si, the altitude and the speed of this intermediate section Si.

For the two above-mentioned embodiments, the pilot may thereafter still modify the LLF phase parameters obtained by the revision via a conventional LLF page displayed on the display screen 10.

For this purpose, the revision device 1 further comprises a conventional modification unit 14 allowing this modification to be carried out. In this case, the pilot can modify (using the input unit 12) at least one of the first parameters relating to the revised flight phase, and the modification unit 14 adapts the revised flight phase to the first parameter thus modified.

The invention claimed is:

1. A method for revising a low-altitude flight phase of a flight path of an aircraft, said low-altitude flight phase (P0) comprising at least one flight section (S1, S2, S3), said low-altitude flight phase (P0) being defined from first parameters comprising phase parameters, including the name and altitude of an entry waypoint (A) and the name and altitude of an exit way point (G), and section parameters, wherein said method comprises:
   inputting second parameters to define an intermediate flight section (Si), said intermediate flight section (Si) having to be inserted into said flight phase, said second parameters comprising the name and the altitude of an upstream way point (C), the name and the altitude of a downstream waypoint (D), an altitude and a speed;
   distributing said first and second parameters so as to allocate them to a first upstream part (P1) of the flight phase, to a second downstream part (P2) of the flight phase and to the intermediate flight section (Si), such that:
   said first parameters, except for the name and the altitude of an exit waypoint, which parameters are substituted with the name and altitude of said upstream waypoint (C) as input in the inputting step, are allocated to said first upstream part (P1);
   said first parameters, except for the name and the altitude of an entry waypoint, which parameters are substituted with the name and altitude of said downstream waypoint (D) as input in the inputting step are allocated to said second downstream part (P2); and
   the altitude and the speed as input in the inputting step are allocated to said intermediate flight section (Si);
   calculating a profile relating to said intermediate flight section (Si) using said input altitude and speed and automatically inserting the profile into the flight phase between said first upstream part (P1) and said second downstream part (P2) so as to establish a revised flight phase (PR) comprising, successively in the direction (E) of flight of the aircraft, said first upstream part (P1), said intermediate section (Si) and said second downstream part (P2); and
   transmitting said revised flight phase (PR) to a user device.

2. The method according to claim 1, wherein the inputting step comprises:
   accessing a page dedicated to revising a low-altitude flight phase, displayed on a display screen, said dedicated page requiring said second parameters to be input; and
   inputting, by input elements, said second parameters comprising the exit waypoint of the first upstream part (P1) and the entry waypoint of the second downstream part (P2) as upstream and downstream waypoints (C, D) respectively.

3. The method according to claim 1, wherein the inputting step comprises:
   accessing a page displayed on a display screen configured for managing a flight plan of the aircraft, said page comprising a part requiring said second parameters to be input; and
   inputting, by input elements, said second parameters allowing the intermediate section to be defined and comprising the start and end waypoints of the intermediate section (Si) as upstream and downstream waypoints (C, D) respectively.

4. The method according to claim 1, further comprising modifying at least one of the first parameters relating to the revised flight phase (PR) and adapting the revised flight phase to the first parameter thus modified.

5. A device for revising a low-altitude flight phase of a flight path of an aircraft, said low-altitude flight phase (P0) comprising at least one flight section (S1, S2, S3), said low-altitude flight phase (P0) being defined from first parameters comprising phase parameters including the name and the altitude of an entry waypoint (A) and the name and altitude of an exit waypoint (G), and section parameters, the device comprising:
   an input unit configured to allow an operator to input second parameters to define an intermediate flight section (Si) to be inserted into said flight phase, said second parameters comprising the name and the altitude of an upstream waypoint (C), the name and the altitude of a downstream waypoint (D), an altitude and a speed;
   a processing unit configured to distribute said first and second parameters so as to allocate the first and second parameters to a first upstream part (P1) of the flight phase, to a second downstream part (P2) of the flight phase and to the intermediate flight section (Si), such that:
   said first parameters, except for the name and the altitude of an exit waypoint, which parameters are substituted with the name and altitude of said upstream waypoint (C) as input, are allocated to said first upstream part (P1);
   said first parameters, except for the name and the altitude of an entry waypoint, which parameters are substituted with the name and altitude of said downstream waypoint (D) as input, are allocated to said second downstream part (P2); and
   the input altitude and speed are allocated to said intermediate flight section (Si),
   said processing unit also being configured to calculate a profile relating to said intermediate flight section (Si) using said input altitude and speed and automatically insert the profile into the flight phase between said first upstream part (P1) and said second downstream part (P2) so as to establish a revised flight phase (PR) comprising, successively in the direction (E) of flight of the aircraft, said first upstream part (P1), said intermediate section (Si) and said second downstream part (P2); and
   a data transmission unit configured to transmit the revised flight phase (PR) to a user device.

6. The device according to claim 5, wherein the input unit comprises:
   a display screen that displays a page dedicated to revising a low-altitude flight phase; and
   input elements configured to allow data to be input into said dedicated page.

7. The device according to claim 5, wherein the input unit comprises:
   a display screen that displays an input window on a page intended for managing a flight plan; and
   input elements configured to allow data to be input into said input window.

8. The device according to claim 5, further comprising a modification unit allowing an adaptation to be carried out following a modification to at least one of the first parameters.

9. A flight management system of an aircraft, the system comprising a revision device for revising a low-altitude flight phase of a flight path of an aircraft, said low-altitude flight phase (P0) comprising at least one flight section (S1, S2, S3), said low-altitude flight phase (P0) being defined from first parameters comprising phase parameters including the name and the altitude of an entry waypoint (A) and the name and altitude of an exit waypoint (G), and section parameters, the revision device comprising:

an input unit configured to allow an operator to input second parameters to define an intermediate flight section (Si) to be inserted into said flight phase, said second parameters comprising the name and the altitude of an upstream waypoint (C), the name and the altitude of a downstream waypoint (D), an altitude and a speed;

a processing unit configured to distribute said first and second parameters so as to allocate the first and second parameters to a first upstream part (P1) of the flight phase, to a second downstream part (P2) of the flight phase and to the intermediate flight section (Si), such that:

said first parameters, except for the name and the altitude of an exit waypoint, which parameters are substituted with the name and altitude of said upstream waypoint (C) as input, are allocated to said first upstream part (P1);

said first parameters, except for the name and the altitude of an entry waypoint, which parameters are substituted with the name and altitude of said downstream waypoint (D) as input, are allocated to said second downstream part (P2); and the input altitude and speed are allocated to said intermediate flight section (Si), said processing unit also being configured to calculate a profile relating to said intermediate flight section (Si) using said input altitude and speed and automatically insert the profile into the flight phase between said first upstream part (P1) and said second downstream part (P2) so as to establish a revised flight phase (PR) comprising, successively in the direction (E) of flight of the aircraft, said first upstream part (P1), said intermediate section (Si) and said second downstream part (P2); and a data transmission unit configured to transmit the revised flight phase (PR) to a user device.

* * * * *